United States Patent [19]

Takeda

[11] Patent Number: 5,669,814
[45] Date of Patent: Sep. 23, 1997

[54] FACILITY INSTALLATION STRUCTURE IN CLEAN ROOM

[75] Inventor: Takefusa Takeda, Hyogo, Japan

[73] Assignee: Mitsubishi Denki Kabushiki Kaisha, Tokyo, Japan

[21] Appl. No.: 688,041

[22] Filed: Jul. 29, 1996

[30] Foreign Application Priority Data

Apr. 11, 1996 [JP] Japan .................... 8-089211

[51] Int. Cl.⁶ .................................. F24F 7/007
[52] U.S. Cl. .......................... 454/187; 55/385.2
[58] Field of Search ........................ 454/185, 186, 454/187; 55/385.2, 467, 473, 484

[56] References Cited

U.S. PATENT DOCUMENTS 5,431,599  7/1995  Genco .................. 454/187

FOREIGN PATENT DOCUMENTS 61-186747  8/1986  Japan ................. 454/187
62-147248  7/1987  Japan ................. 464/187
6-193243   7/1994  Japan ................. 454/187

*Primary Examiner*—Harold Joyce
*Attorney, Agent, or Firm*—Lowe, Price, LeBlanc & Becker

[57] ABSTRACT

A floor surface located directly under a facility is provided with an open space. A shut out member is formed to surround the open space. The shut out member extends from the bottom part of the facility to the floor surface. Connection members are placed in a space nearly completely closed by the shut out member and the bottom surface of the facility for connecting the facility with the main power system.

8 Claims, 11 Drawing Sheets

FACILITY INSTALLATION STRUCTURE IN CLEAN ROOM

BACKGROUND OF THE INVENTION

1. Field of the Invention

The present invention relates to the facility installation structure in a clean room which has become much in demand and increasingly constructed recently.

2. Description of the Background Art

A clean room used in a semiconductor process has been widely known. The clean room refers to a room in which the amount of dust and small particles is controlled below the specified level and the environmental conditions such as pressure, temperature, humidity, and the distribution of the air flow are also controlled. In the clean room, processing apparatus, evaluation and analyzing system, inspection apparatus, package system, robot, tools, transportation system, appliances, and the like (these are all hereinafter simply referred to as "facilities") are installed.

FIG. 8 schematically shows one example of the structure of a conventional clean room. With reference to FIG. 8, a body of a clean room structure 4 is provided with a ceiling portion 5, a ceiling filter portion 6, a clean room 7, a floor structure 8, and a utility portion 9. An air conditioning apparatus 10 is also provided adjacent to the body of the structure 4. Ceiling filter portion 6 includes filters 14 constituted by such filters as HEPA (High Efficiency Particulate Air-filter) or ULPA (Ultra Low Penetration Air-filter), and filter attachment frames 15. Filters 14 of the required number are put in between filter attachment frames 15 without any gap and they have a function of removing dust and small particles in the air.

As shown in FIG. 8, the air supplied from air conditioning apparatus 10 is sent into a space 13 as shown by an arrow 11. The air is then sent into clean room 7 through filters 14 in ceiling filter portion 6, and into a space 12 in utility portion 9 placed under clean room 7 through clean room 7 and floor structure 8. Thereafter, the air is again sent into air conditioning apparatus 10.

Next with reference to FIGS. 9 and 10, the conventional installation structure of a facility 16 in clean room 7 is described. FIG. 9 is a perspective view showing one example of the conventional installation structure of facilities 16 in clean room 7. FIG. 10 is an enlarged cross section of the installation structure of facility 16 in FIG. 9.

First referring to FIG. 9, floor structure 8 includes a latticed beam 20 as a base, an adjustment plate 22 provided on beam 20, a drop prevention net 23 provided on adjustment plate 22, and a grated panel 24 mounted on prevention net 23. Facilities 16 are installed on floor structure 8 via support bolts 18.

As shown in FIG. 10, utility portion 9 is provided under floor structure 8, and main power systems 28a and 28b are installed within utility portion 9 for the input/output of the power such as water, air, chemical, gas, light, and signals. Main power systems 28a and 28b are connected to facility 16 by connection members 26a, 26b, 27a, 27b. As shown in FIG. 9, connection members 26a and 26b are respectively connected to connection members 27a and 27b by joint means 30a and 30b. Control means 29a and 29b are also attached to connection members 27a and 27b respectively as shown in FIG. 10.

Referring to FIGS. 9 and 10, connection members 26a and 26b are provided such that they project horizontally from the side of the lower part of facility 16. Connection members 26a and 26b are mounted in this manner to facilitate mounting of these connection members 26a, 26b. As shown in FIGS. 9 and 10, there must be a penetration space 31 in grated panel 24 located around facility 16, for receiving connection members 27a and 27b connected to connection members 26a and 26b.

With reference to FIG. 11 next, the structure of penetration space 31 and floor structure 8 is described in detail. Referring to FIG. 11, a plurality of adjustment holes 21 of prescribed size are provided in adjustment plate 22 mounted on beam 20. The flow rate of the air passing through clean room 7 is adjusted by adjustment holes 21. According to the shape of penetration space 31, a cut-out is provided in adjustment plate 22 located under penetration space 31. Drop prevention net 23 prevents the dropping of a jig or the like from clean room 7, and has gaps which allow the air from clean room 7 to smoothly pass through them. A cut-out is also provided in drop prevention net 23 according to the shape of penetration space 31.

Grated panel 24 is in the form of a lattice and has a function of holding and securing facility 16 and allowing the air from clean room 7 to pass smoothly through it. Screw holes 36 are provided at prescribed positions of beam 20, so that grated panel 24, drop prevention net 23 and adjustment plate 22 are fixed on beam 20 by a fixing member 25 such as a screw screwed in screw hole 36.

However, clean room 7 of above described structure has various problems as follows. As shown in FIGS. 9 and 10, connection members 26a and 26b are provided such that they horizontally project from the side of the lower part of facility 16. Therefore, the replacement and maintenance of connection members 26a and 26b or 27a and 27b should be conducted within clean room 7. The process to be performed within clean room 7 is then interrupted and furthermore, the cleanliness within clean room 7 can be degraded.

Penetration space 31 should be provided in grated panel 24 located around facility 16 for placing connection members 27a and 27b connected to connection members 26a and 26b. Accordingly, floor surface 17 around facility 16 cannot be effectively utilized.

Penetration space 31 is required to have much larger opening area than the cross-sectional area of connection members 27a and 27b in order, for example, to place members 27a and 27b through space 31. The gap in penetration space 31 around connection members 27a and 27b is necessary to be filled with any means in order to make it continuous to floor surface 17. However, filling the gap in above manner is difficult since the gap tends to have a complex shape.

As shown by arrow 11 in FIG. 10, the air could flow in the gap from the peripheral region of penetration space 31. As a result, the air flow in the periphery of penetration space 31 will be disturbed. The dust and small particles in the air can be easily diffused into clean room 7.

Since the air is allowed to pass easily into penetration space 31, the flow rate of the air passing through the other portion of floor structure 8 may be relatively decreased. In this case, the diffusion of the dust and small particles into clean room 7 often occurs, causing the insufficient flow rate of the air. When the flow rate of the air becomes seriously insufficient, additional cost is required for compensating for the air flow.

SUMMARY OF THE INVENTION

The present invention is made to solve the problems described above. One object of the present invention is to provide a facility installation structure in a clean room which enables an effective use of the region of the floor surface surrounding the facility installed within a clean room, prevents the disturbance of the air flow in the clean room, ensures sufficient flow rate of the air, and enables work such as the replacement of connection members which connect the facility with a power system, without degrading the performance of the clean room.

In the facility installation structure in the clean room according to the invention, a plurality of first penetration holes are provided at a floor surface around the facility for discharging the air supplied to the clean room into a space under the floor surface, and a second penetration hole which has a larger opening area than that of the first penetration hole is provided at the floor surface directly below the facility. A shut out member extending from the bottom of the facility to the region of the floor surface surrounding the second penetration hole is provided for preventing the air flow toward the floor surface from entering the second penetration hole.

In the facility installation structure in the clean room according to the present invention, the second penetration hole is provided directly under the facility. The connection member for connecting the power system with the facility can be provided directly under the facility through the second penetration hole since the opening area of the second penetration hole is larger than that of the first penetration hole provided at the region of the floor surface surrounding the second penetration hole. Different from the conventional embodiment, penetration space placed somewhere around the facility becomes unnecessary and the region of the floor surface surrounding the facility can be effectively used. The shut out member extending from the bottom of the facility onto the region of the floor surface surrounding the second penetration hole is further provided. The shut out member provides a hermetical partition between the space directly under the bottom of the facility and the space in the clean room. Without degrading the performance such as cleanliness within the clean room, the replacement and maintenance of above connection members can be performed within the space surrounded by the shut out member. The shut out member can also prevent the air flow from the region above the facility into the first penetration hole provided at the floor surface from entering the second penetration hole. In other words, the predominant air flow into the second penetration hole which has relatively larger opening area can be effectively prevented. As a result, the disturbance of the air flow can be effectively prevented and sufficient air flow rate can be ensured in the clean room.

It is noted that the second penetration hole is large enough to allow a person to pass through it. The person can then enter the space surrounded by the shut out member from under the floor surface and carry out the replacement and maintenance of the connection members.

The shut out member may be provided with a side plate portion extending from the bottom of the facility nearly directly down toward the floor surface, and a bottom portion extending from the lower end of the side plate portion to the second penetration hole along the floor surface. The air flows directly down along the side plate portion since the side plate portion extends directly downwards. The bottom portion can cover the first penetration holes placed around the second penetration hole. The air flow from the clean room into the second penetration hole can be effectively prevented.

Preferably, a plurality of first penetration holes are provided in the region of the floor surface surrounding the second penetration hole so that they surround the second penetration hole, and the bottom portion extends over the first penetration holes. The length of the bottom portion projected from the lower end of the side plate portion (shown by L in FIG. 4) is preferably defined so that it may cover at least the first penetration hole placed directly under the bottom portion. The prevention of the air flow into the second penetration hole can be accordingly ensured.

The shut out member may be provided with a bottom plate portion which has a central cut out portion exposing the second penetration hole, and a side plate portion extending from the bottom of the facility nearly directly down to the surface of the bottom plate portion. The air flow into the second penetration hole can be also effectively prevented.

Preferably, the side plate portion is mounted on the bottom plate portion so that the peripheral edge of the bottom plate portion projects outward from the outer surface of the side plate portion, and the bottom plate portion extends over the plurality of first penetration holes surrounding the second penetration hole. The width from the peripheral edge of the bottom plate portion to the central cut out portion thereof is preferably defined such that it may cover one of the first penetration holes placed directly under the bottom plate portion. The air can be prevented from flowing into the second penetration hole.

The floor of the clean room is preferably provided with a base constituted by a latticed beam and a latticed grated panel mounted on the base. The surface of the grated panel constitutes the floor surface and the first penetration hole is defined by the lattice of the grated panel. Preferably, the second penetration hole is provided by selectively removing some portion of the grated panel placed directly under the facility. As the second penetration hole can be produced by selectively removing some portion of the grated panel placed directly under the facilities, its formation is easy. Reduction of cost can be achieved since the number of the grated panels necessary for constructing the floor surface of the clean room is reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Referring to FIGS. 1 to 7, the embodiments of the present invention will be described. It is noted that the components identical to those in the conventional embodiment have the same reference numbers and the description of them is not repeated.

[First Embodiment]

With reference to FIGS. 1 to 4 first, the first embodiment of the present invention will be described.

Figure 1:
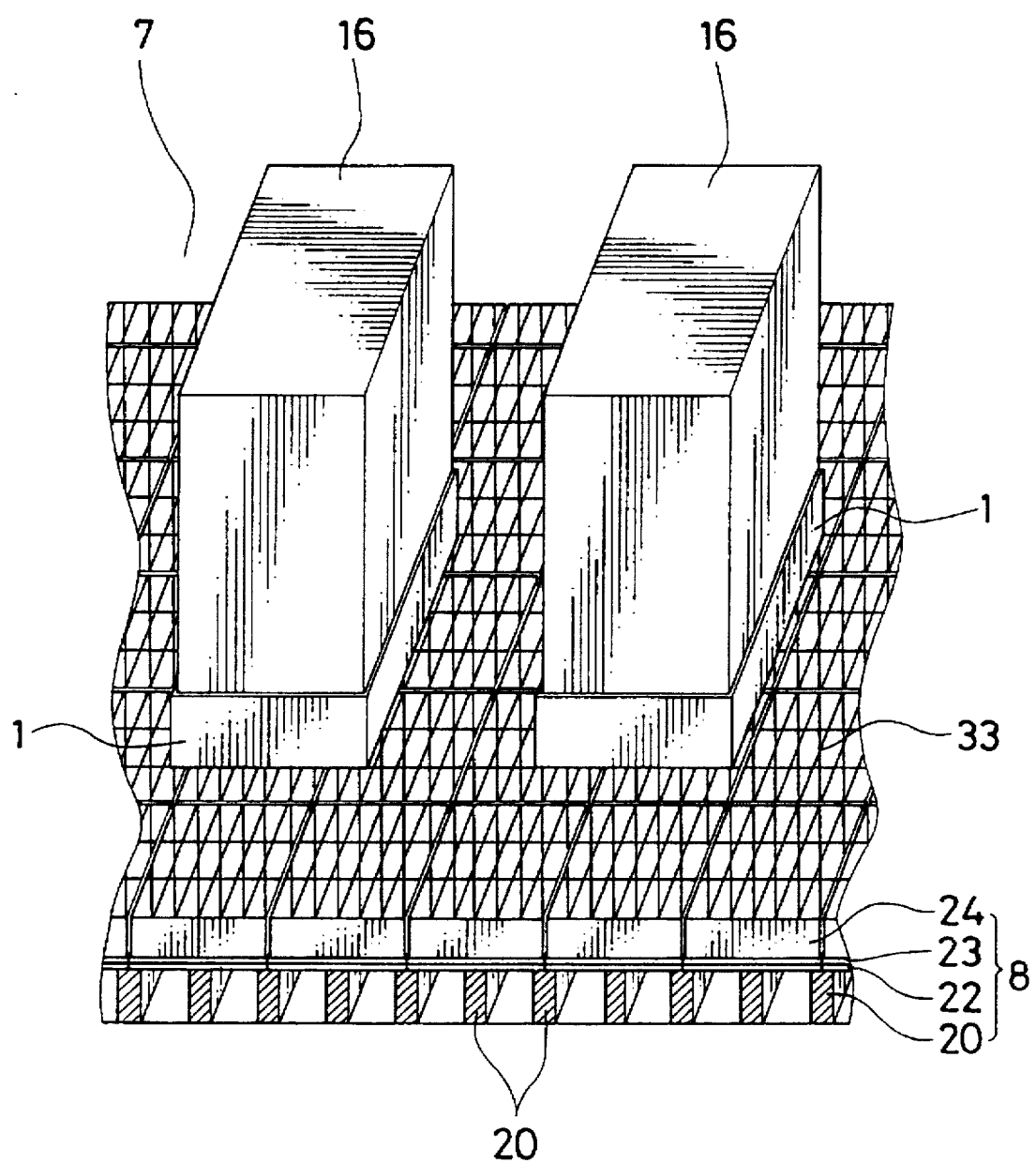
FIG. 1 is a perspective view illustrating the installation structure of facilities in a clean room according to the first embodiment of the invention.

Shut out member 1 is provided such that it surrounds the space between the bottom surface of facility 16 and floor structure 8 as shown in FIG. 1. Shut out member 1 is formed, for example, of hard plastic.

Next with reference to FIG. 2, an open space 35 is provided directly below facility 16 so that it communicates with a space 19 surrounded by shut out member 1. Open space 35 is provided by selectively removing some portions of grated panel 24, adjustment plate 22 and drop prevention net 23 placed directly under facility 16.

Figure 2:
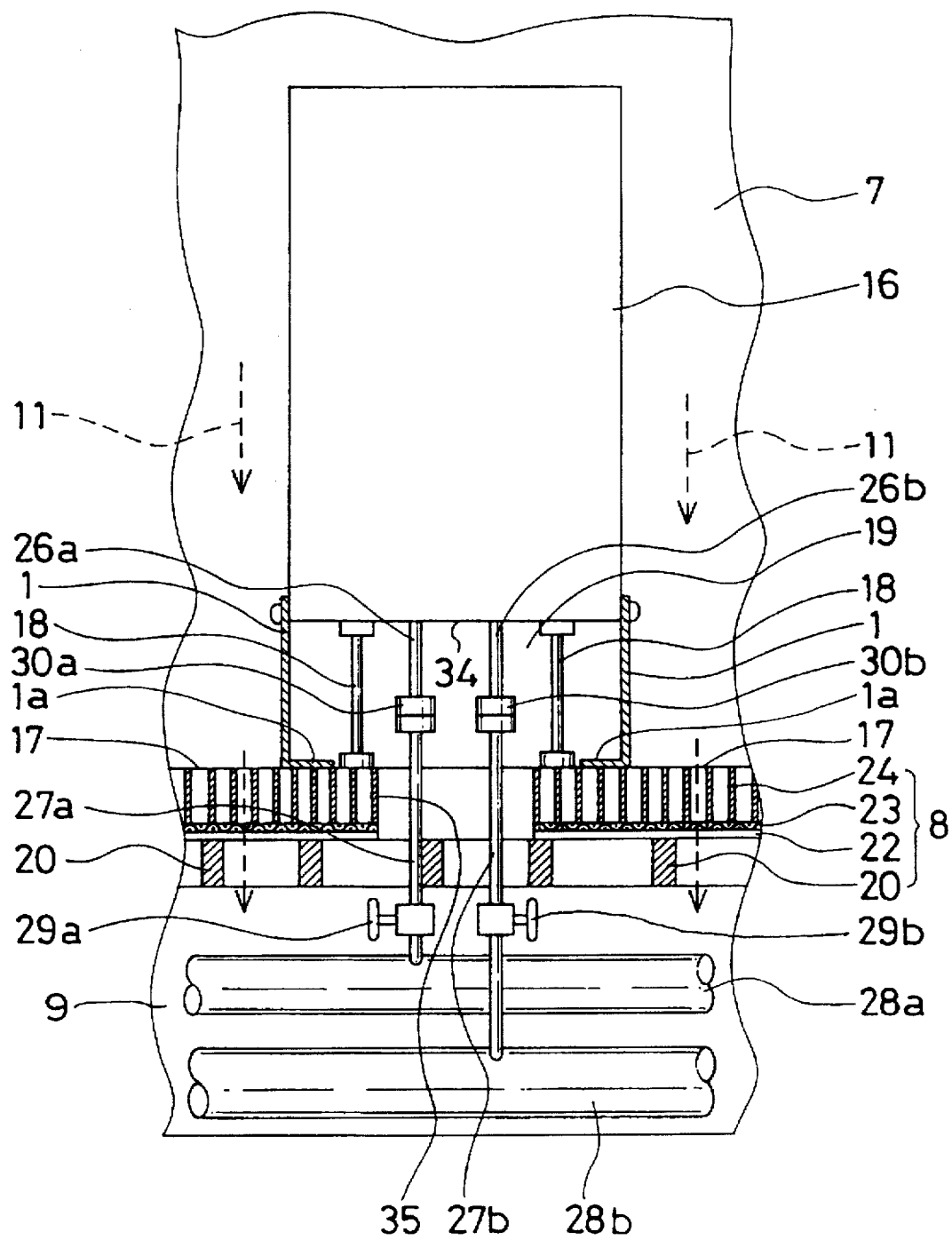
FIG. 2 is a cross section showing the installation structure of the facility in a clean room according to the first embodiment of the invention.
Figure 3:
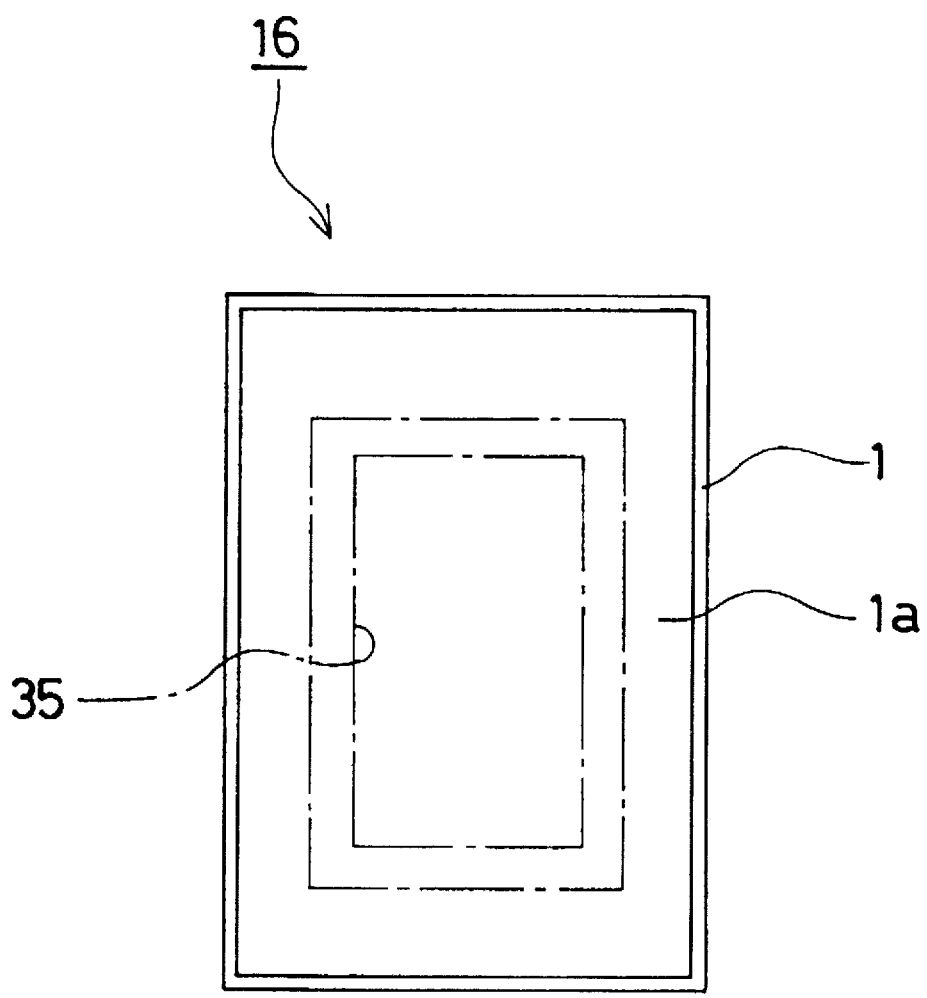
FIG. 3 is a plan view of the facility shown in FIG. 1.

As shown in FIG. 2, shut out member 1 has an L shaped cross section and is attached on the outer surface of facility 16 by a fixing member such as a screw, and provided with a side plate portion extending from the bottom part of facility 16 nearly directly down toward floor surface 17, and a bottom portion 1a extending from the lower edge of the side plate portion toward open space 35 along floor surface 17. The arrangement of shut out member 1 and open space 35 of above described structure is two-dimensionally shown in FIG. 3. It is recognized from FIG. 3 that bottom portion 1a is provided such that it surrounds open space 35. The air in clean room 7 can be prevented from flowing into open space 35, as bottom portion 1a is adhered to floor surface 17.

Figure 4:
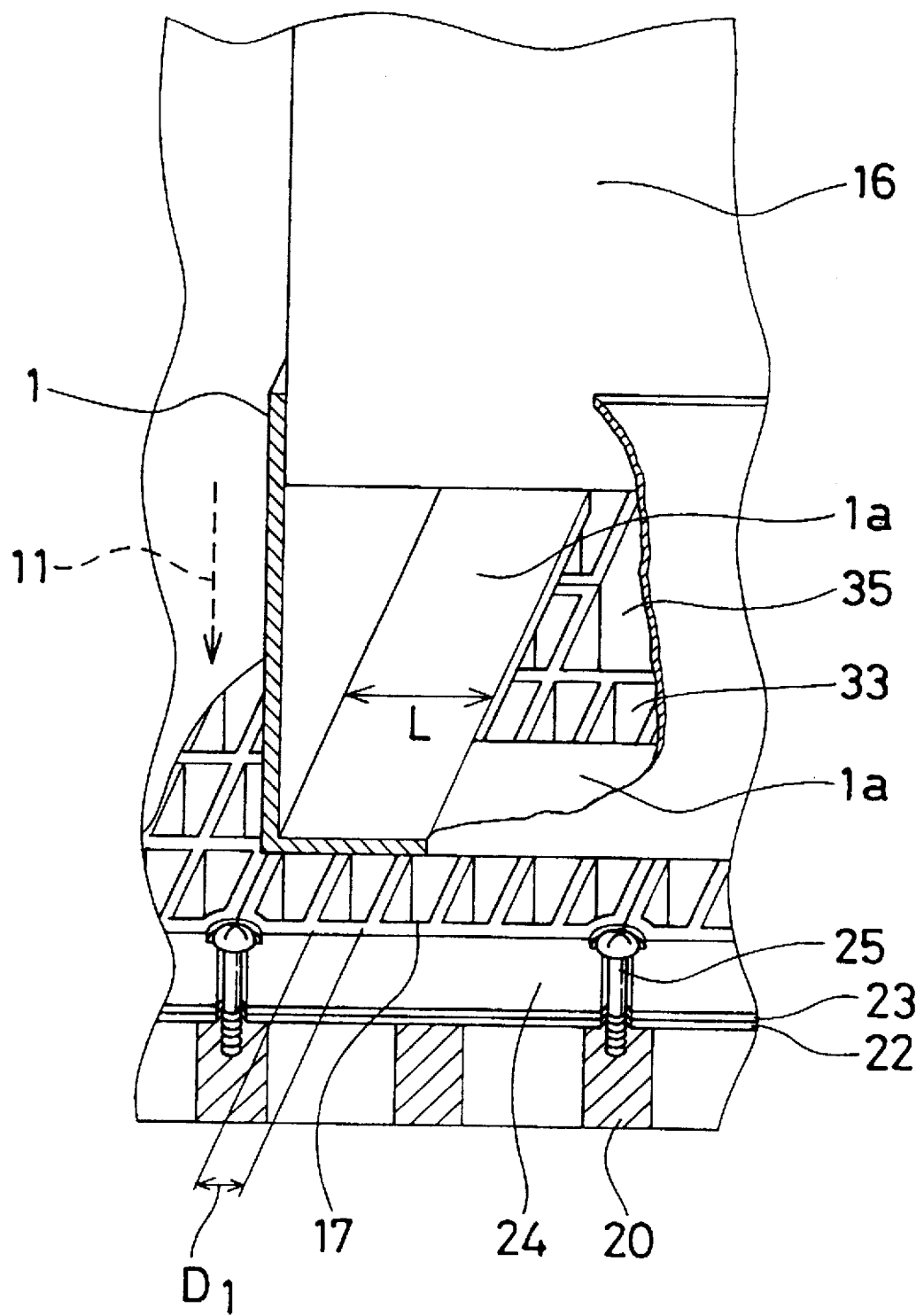
FIG. 4 is a cross sectional perspective view partially illustrating the shut out member shown in FIG. 1.

Now with reference to FIG. 4, the structure of shut out member 1 is explained in more detail. A number of penetration holes 33 defined by the lattice of grated panel 24 are provided around open space 35. The opening area of each penetration hole 33 is adjusted to be smaller than that of open space 35. Bottom portion 1a extends over penetration holes 33 placed around open space 35. The length L of the part projected from the lower edge of the side plate portion of shut out member 1 is adjusted to be larger than the opening width D1 of one penetration hole 33 located directly under bottom portion 1a. In other words, the length L of the projected portion is defined so that it covers at least one of penetration holes 33 located directly under bottom portion 1a. The air flowing from clean room 7 into open space 35 can be almost certainly prevented.

Figure 9:
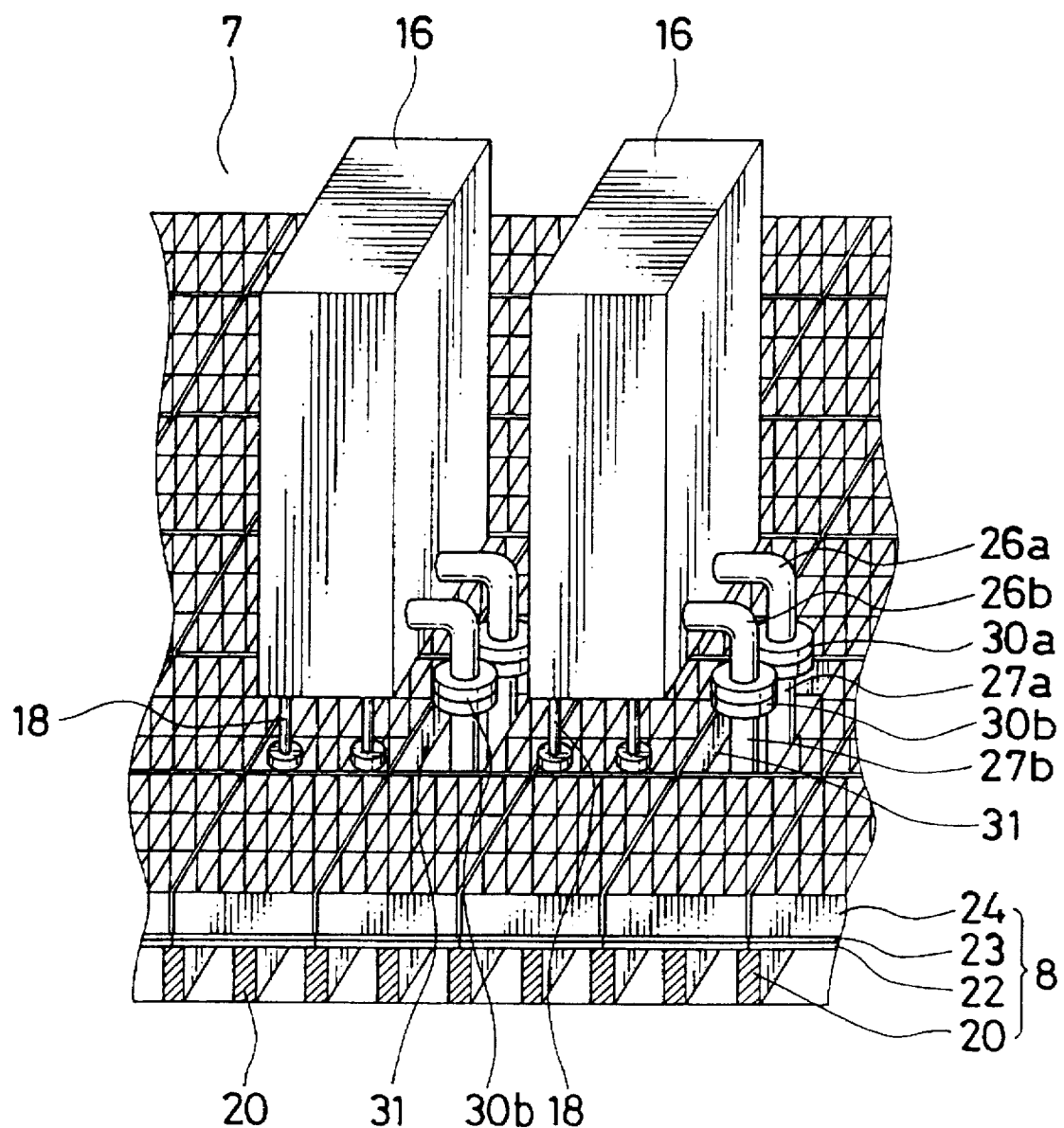
FIG. 9 is a perspective view illustrating one example of the installation structure of facilities in a conventional clean room.
Figure 10:
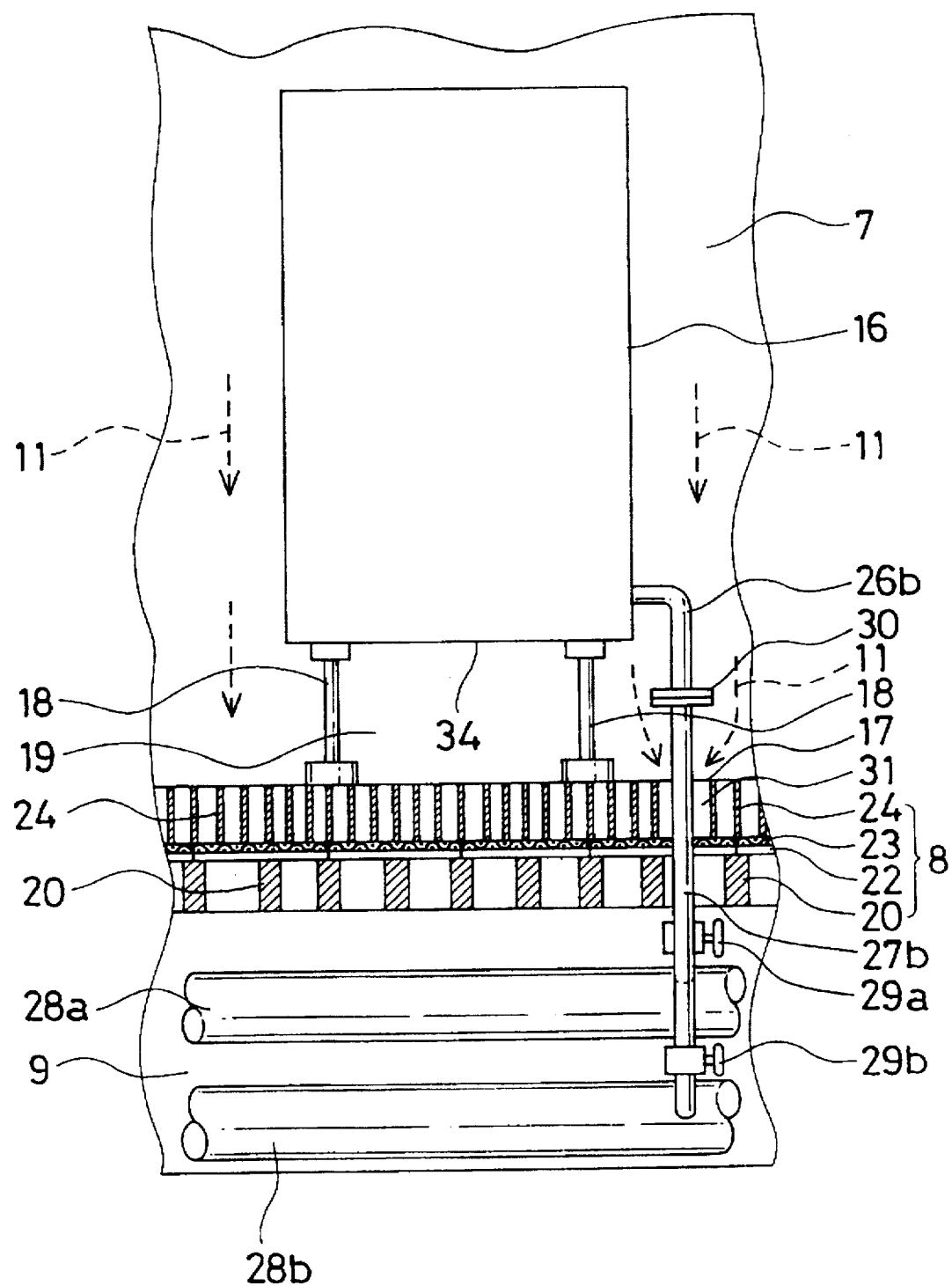
FIG. 10 is a cross section showing one example of the installation structure of the facility in a conventional clean room.
Figure 11:
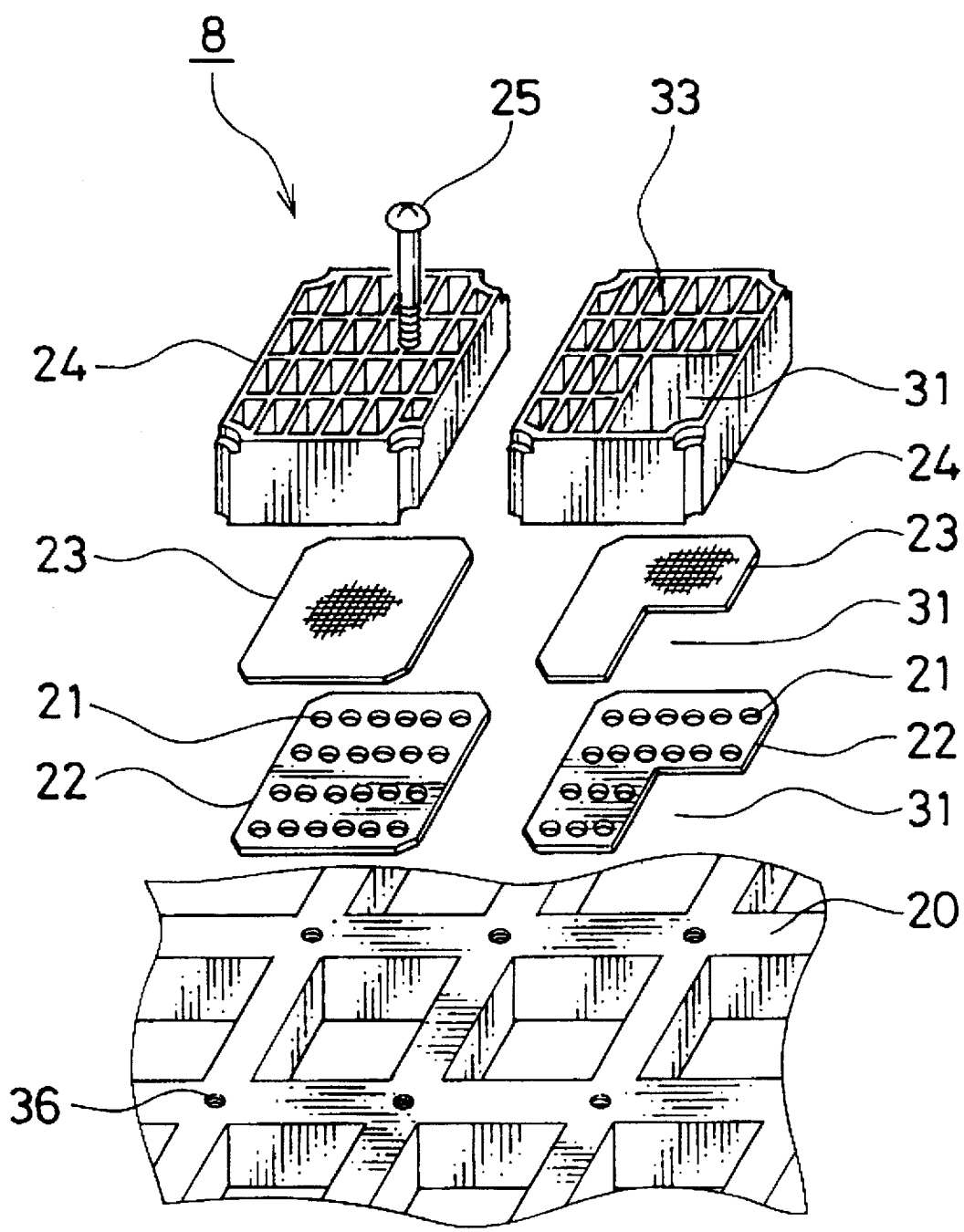
FIG. 11 is an exploded perspective view showing the conventional floor structure.

With reference to FIG. 2 again, connection members 26a, 26b, 27a, 27b connecting facility 16 with main power systems 28a and 28b are placed directly under facility 16. What corresponds to penetration space 31 shown in FIG. 9 becomes unnecessary. Therefore, floor surface 17 around facility 16 can be effectively utilized.

Open space 35 preferably has enough opening area to allow a person to pass through it. The replacement or maintenance work of connection members 26a, 26b, 27a, 27b can be proceeded by any person entering space 19 directly under facility 16 through open space 35. Space 19 can be hermetically separated from the space inside clean room 7 by a bottom surface 34 of facility 16 and shut out member 1, so that the performance inside of clean room 7 such as cleanliness would not be degraded even if the work is performed in space 19. Therefore, space 19 is preferably hermetically separated from the space inside clean room 7 also by bottom surface 34 of facility 16.

[Second Embodiment]

Figure 5:
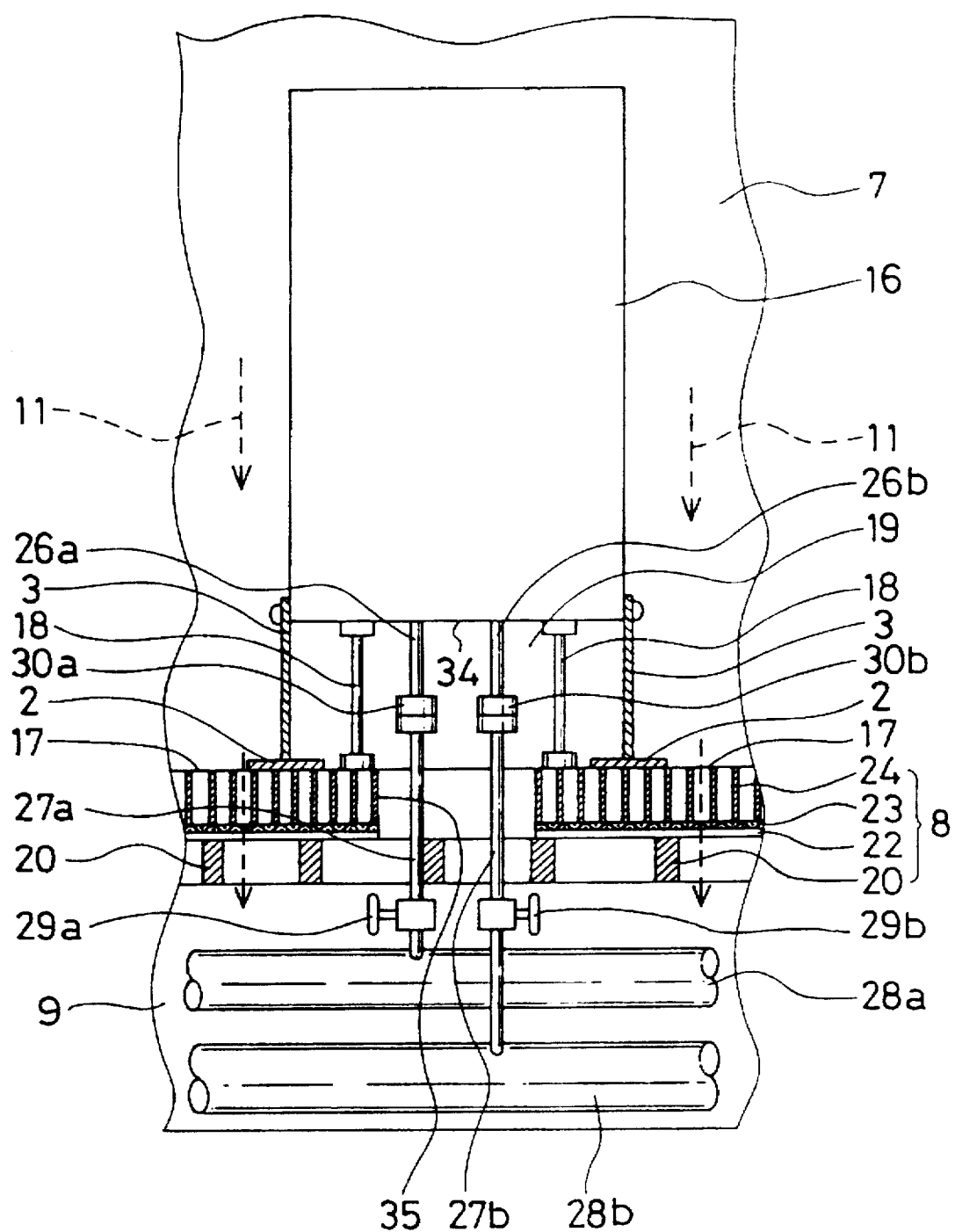
FIG. 5 is a cross section illustrating the installation structure of the facility in a clean room according to the second embodiment of the invention.
Figure 6:
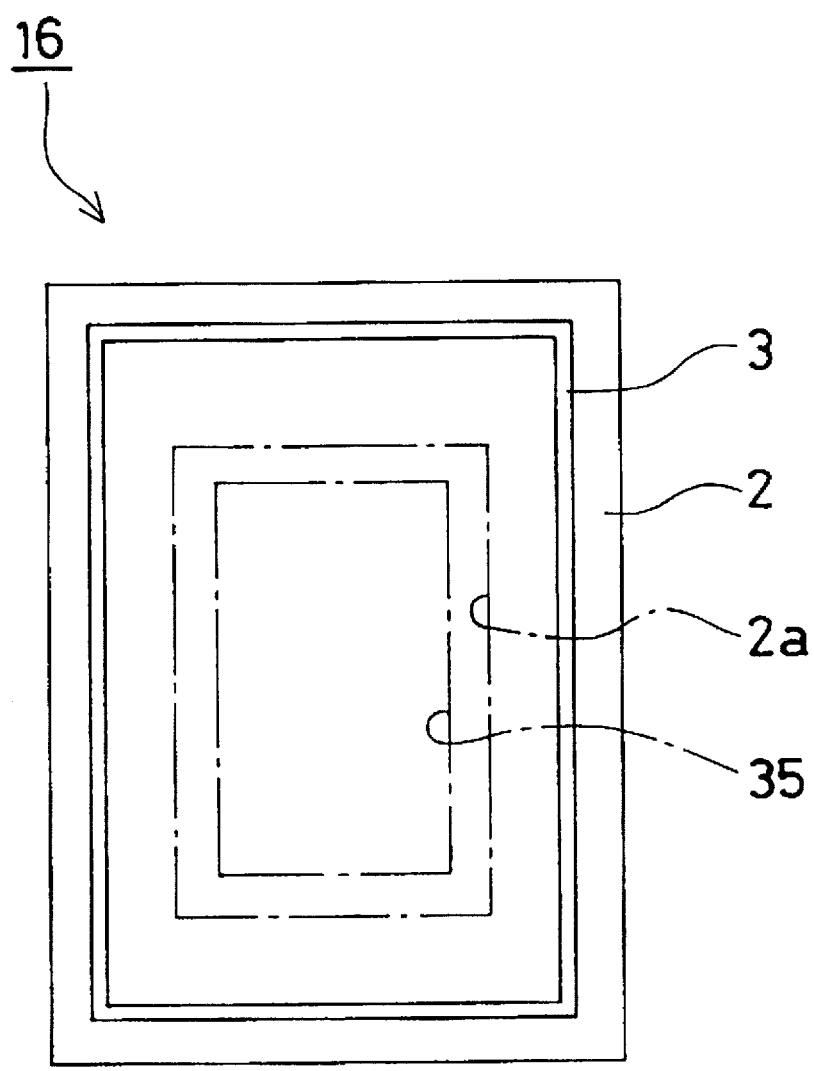
FIG. 6 is a plan view of the facility shown in FIG. 5.
Figure 7:
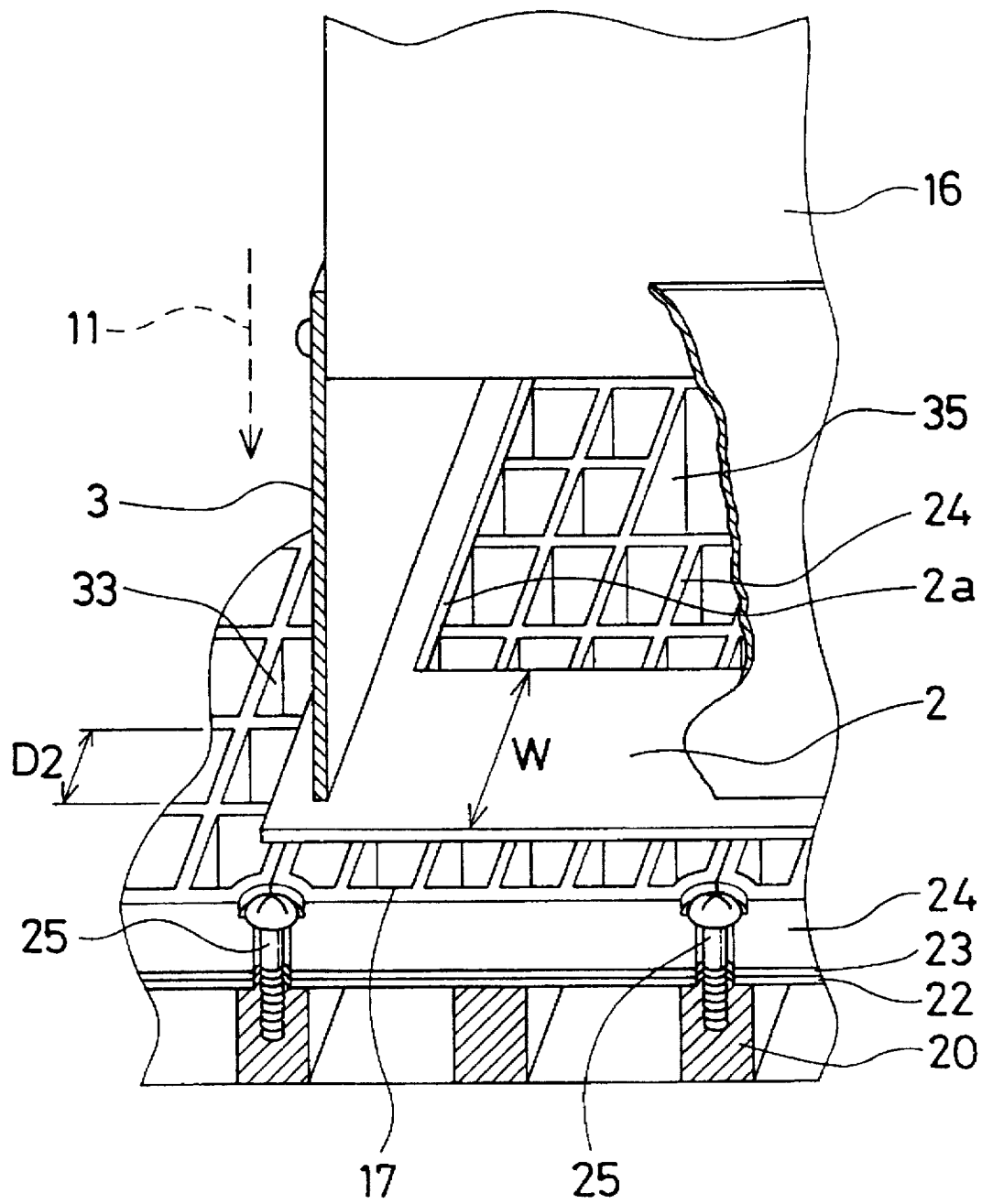
FIG. 7 is a cross sectional perspective view partially illustrating the shut out member shown in FIG. 5.
Figure 8:
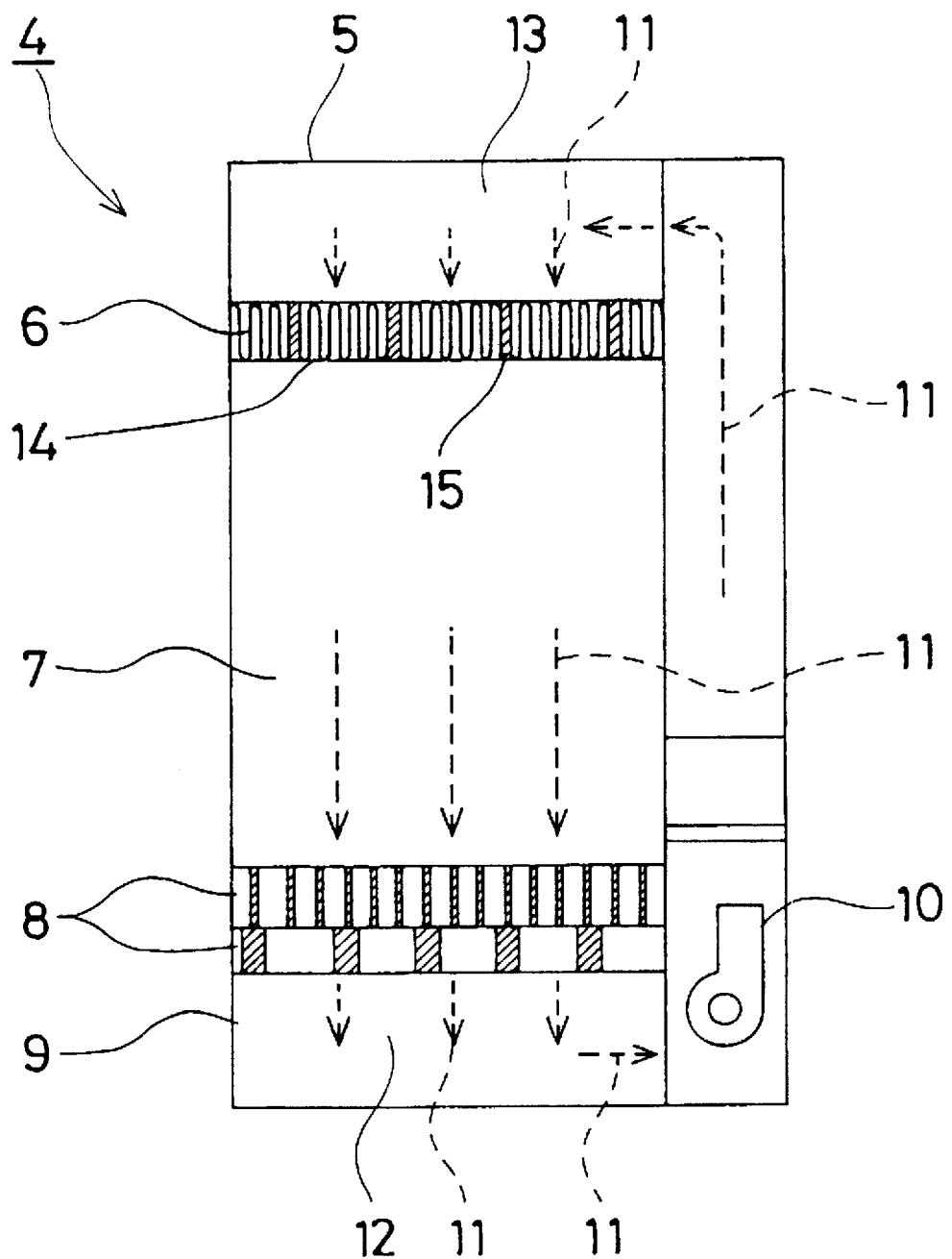
FIG. 8 schematically shows the structure of a clean room.

Next with reference to FIGS. 5–7, the second embodiment of the present invention is described.

First referring to FIG. 5, shut out member 1, according to the second embodiment is constituted by a floor seal member (bottom plate portion) 2 and side plate portion 3. As shown in FIG. 6, floor seal member 2 has a central cut out portion 2a which exposes open space 35. Side plate portion 3 is attached around the outer surface of facility 16 and extends from the bottom part of facility 16 nearly directly down to the surface of floor seal member 2. Side plate portion 3 may be attached around the outer surface of facility 16 by, for example, some screws.

The two-dimensional width W from the outer edge of floor seal member 2 to central cut out portion 2a is preferably defined such that one penetration hole 33 placed directly under floor seal member 2 can be covered. More particularly, the two-dimensional width W of floor seal member 2 is defined to be larger than the opening width D2 of one penetration hole 33. The air in clean room 7 can be almost certainly prevented from flowing into open space 35 placed directly under facility 16.

Floor seal member 2 is preferably placed to adhere to the surface of grated panel 24 (floor surface 17). The lower edge of side plate portion 3 is also preferably adhered to the surface of bottom plate portion 2, and the upper edge of side plate portion 3 is preferably secured to adhere to the bottom part of facility 16. The effect described above is accordingly enhanced.

According to the present invention, a penetration hole corresponding to the conventional penetration space 31 is not required at the region of the floor surface surrounding the facility, since the second penetration hole is provided directly under the facility. Accordingly, the floor surface around the facility can be effectively utilized. As a result, the efficiency of the investment can be improved. A shut out member is provided such that it surrounds the second penetration hole, allowing the effective prevention of the air flow from the clean room into the second penetration hole. The disturbance of the air flow is relatively smaller than that found in the conventional method, so that the diffusion of dust, small particles, or the like can be effectively prevented. The improvement of the yield and the quality can be achieved accordingly.

The connection means for connecting the power system placed under the floor surface with the facility can be provided directly under the facility through the second penetration hole. The replacement or maintenance of the connection means can be proceeded in the space separated from the space in the clean room by the shut out member. The necessity to enter the clean room for the replacement or maintenance work on such connection means can be significantly reduced, leading to the effective prevention of the degradation of the clean room performance such as the cleanliness. As a result, the productivity can be enhanced. Visual appearance of the inside of the clean room becomes neat, as the connection means is provided directly under the facility.

It is further possible for any person to enter the space closed by the shut out member by adjusting the size of the second penetration hole to enable any person to pass through the hole. The replacement or maintenance work on the connection means can be easily performed accordingly.

The shut out member is structured such that it has the side plate portion and the bottom portion, or the side plate portion and the bottom plate portion, so that the air in the clean room can be prevented from flowing into the second penetration hole. The loss of the air flow rate or insufficient flow rate can be effectively prevented. As a result, the cost concerning the power or the installation can be saved.

The second penetration hole can be formed by selectively removing some part of the grated panel. The floor structure directly under the facility can be simplified accordingly. As a result, the cost of the installation can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An installation structure of a facility provided on the floor surface of a clean room, comprising:

a plurality of first penetration holes provided at said floor surface around said facility for discharging air supplied to said clean room into a space under said floor surface;

a second penetration hole having an opening area larger than that of said first penetration holes provided at said floor surface which is located directly under said facility;

a shut out member extending from the bottom part of said facility onto said floor surface around said second penetration hole for preventing the air flowing toward said floor surface from entering said second penetration hole.

2. The installation structure of the facility according to claim 1, wherein a power system is installed under said floor surface for supplying/discharging of the power for said facility, and said power system is connected to said facility via connection means placed under said facility through said second penetration hole.

3. The installation structure of the facility according to claim 2, wherein said second penetration hole is large enough to allow a person to pass through it.

4. The installation structure of the facility according to claim 1, wherein said shut out member has a side plate portion extending from the bottom part of said facility nearly directly down toward said floor surface, and has a bottom portion extending from the lower edge of said side plate portion along said floor surface toward said second penetration hole.

5. The installation structure of the facility according to claim 4, wherein said plurality of first penetration holes are provided at said floor surface around said second penetration hole to surround said second penetration hole, said bottom portion extends over said first penetration holes around said second penetration hole, and the length of said bottom portion projected from the lower edge of said side plate portion is defined such that it can cover one of said first penetration holes placed directly under said bottom portion.

6. The installation structure of the facility according to claim 1, wherein said shut out member has a bottom plate portion provided with a central cut out portion which exposes said second penetration hole, and provided with a side plate portion extending from the bottom part of said facility nearly directly down to reach the surface of said bottom plate portion.

7. The installation structure of the facility according to claim 6, wherein said side plate portion is mounted on said bottom plate portion such that the outer edge of said bottom plate portion projects outward from the outer surface of said side plate portion, said plurality of first penetration holes are provided at said floor surface around said second penetration hole such that they surround said second penetration hole, said bottom plate portion extends over said first penetration holes around said second penetration hole, and a width of said bottom plate portion from said outer edge to said central cut out portion is defined such that it can cover one of said first penetration holes placed directly under said bottom plate portion.

8. The installation structure of the facility according to claim 1, wherein the floor of said clean room is provided with a base structured by a latticed beam and a latticed grated panel mounted on said base, said floor surface is structured by said surface of said grated panel, said first penetration holes are defined by the lattice of said grated panel, and said second penetration hole is formed by selectively removing said grated panel placed directly under said facility.

* * * * *